(12) United States Patent
Nishine et al.

(10) Patent No.: US 12,122,184 B2
(45) Date of Patent: Oct. 22, 2024

(54) DECORATIVE MATERIAL AND METHOD FOR PRODUCING SAME

(71) Applicant: Dai Nippon Printing Co., Ltd., Tokyo (JP)

(72) Inventors: Shota Nishine, Asaka (JP); Takeru Ogasawara, Shiki (JP); Takaho Saito, Adachi-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 357 days.

(21) Appl. No.: 17/442,096

(22) PCT Filed: Mar. 27, 2020

(86) PCT No.: PCT/JP2020/014064
§ 371 (c)(1),
(2) Date: Oct. 26, 2021

(87) PCT Pub. No.: WO2020/196840
PCT Pub. Date: Oct. 1, 2020

(65) Prior Publication Data
US 2022/0161593 A1   May 26, 2022

(30) Foreign Application Priority Data
Mar. 28, 2019  (JP) .................................. 2019-063362

(51) Int. Cl.
*B44C 5/04* (2006.01)
*B32B 3/30* (2006.01)
(Continued)

(52) U.S. Cl.
CPC .............. *B44C 5/0469* (2013.01); *B32B 3/30* (2013.01); *B32B 27/10* (2013.01); *B32B 27/42* (2013.01);
(Continued)

(58) Field of Classification Search
CPC ... B44C 1/1756; B44C 1/1704; B44C 1/1712; B44C 1/1752; B44C 1/1708;
(Continued)

(56) References Cited

U.S. PATENT DOCUMENTS

2016/0068705 A1\* 3/2016 Sutou ................... C09D 133/00
156/247

FOREIGN PATENT DOCUMENTS

JP       S57-15933 A    1/1982
JP       S57-122969 A   7/1982
(Continued)

OTHER PUBLICATIONS

European Search Report dated Oct. 18, 2023, issued in EP patent application No. 23186512.2.

*Primary Examiner* — Catherine A. Simone
(74) *Attorney, Agent, or Firm* — Locke Lord LLP

(57) ABSTRACT

The present invention provides a decorative material having a stereoscopic visual effect and a better feel. A decorative material comprising at least a base material, comprising a first region and a second region within a plane of the decorative material when seen in planar view, wherein the first region includes a peelable ink decoration layer disposed on the base material and a first recess formed immediately above the peelable ink decoration layer, and the second region includes a second recess deeper than the first recess.

10 Claims, 4 Drawing Sheets

(51) Int. Cl.
*B32B 27/10* (2006.01)
*B32B 27/42* (2006.01)
*B32B 29/00* (2006.01)
*B32B 37/26* (2006.01)
*B32B 38/00* (2006.01)
*B32B 38/06* (2006.01)

(52) U.S. Cl.
CPC ............ *B32B 29/005* (2013.01); *B32B 37/26* (2013.01); *B32B 38/06* (2013.01); *B32B 38/145* (2013.01); *B32B 2037/268* (2013.01); *B32B 2250/03* (2013.01); *B32B 2260/028* (2013.01); *B32B 2260/046* (2013.01); *B32B 2305/72* (2013.01); *B32B 2307/4023* (2013.01); *B32B 2307/748* (2013.01); *B32B 2317/125* (2013.01); *B32B 2451/00* (2013.01)

(58) Field of Classification Search
CPC ......... B44C 3/005; B44C 5/0469; B44C 5/04; B44C 5/043; B44F 9/02; B32B 3/30; B32B 27/10; B32B 27/42; B32B 29/005; B32B 37/26; B32B 38/06; B32B 38/145; B32B 2037/268; B32B 2307/4023; B32B 2307/748; B32B 2317/125; B32B 2451/00; B32B 2260/046; B32B 2260/028; B32B 2250/03; B41M 3/12; D06N 3/0097
USPC ................................ 428/156, 167, 202, 914
See application file for complete search history.

(56) References Cited

FOREIGN PATENT DOCUMENTS

| | | |
|---|---|---|
| JP | H01-269510 A | 10/1989 |
| JP | H10-6467 A | 1/1998 |
| JP | 2015-193209 A | 11/2015 |
| JP | 2017-52264 A | 3/2017 |
| JP | 2017-87544 A | 5/2017 |
| JP | 2018-14188 A | 1/2018 |

* cited by examiner

DECORATIVE MATERIAL AND METHOD FOR PRODUCING SAME

TECHNICAL FIELD

The present invention relates to a decorative material and a method for producing the same.

BACKGROUND ART

Traditionally, decorative materials are used for surfaces of tables, countertops, walls, floors, and the like, the decorative materials being prepared by impregnating a porous base material such as titanium paper with an uncured melamine resin solution, optionally laminating the porous base material on a phenol core paper, and curing the impregnated resin solution by heat press. Those decorative materials containing such an impregnated and cured melamine resin have physical properties such as strength, hardness, and heat resistance.

Such decorative materials above should have a design to give a sense of luxury, and a uneven structure is formed on their surfaces to provide a stereoscopic visual effect.

As such decorative materials having a uneven structure on their surfaces, embossed decorative materials are proposed, which are prepared using an embossing plate having a uneven structure (textured mirror plate) (for example, see PTLs 1 and 2).

However, if a design having a desired uneven structure is provided on the surfaces of the decorative materials disclosed in PTLs 1 and 2, embossing plates corresponding to patterns are needed, thus leading an increase in cost and difficulties in production. Moreover, in such a decorative material, it is difficult to match the uneven structure with the pattern of the undercoat, and this is obstructive in providing high designability.

In contrast, PTL 3 proposes a decorative material having a surface uneven structure without using embossing plate.

CITATION LIST

Patent Literature

PTL 1; JP 2015-193209 A
PTL 2; JP 2017-87544 A
PTL 3; JP 2018-14188 A

SUMMARY OF INVENTION

Technical Problem

In the decorative material disclosed in PTL 3, a uneven structure is formed by partially peeling a coating layer formed on a support sheet, and the embossing plate is not used. Thus, the problems that PTLs 1 and 2 have can be solved.

However, in the decorative material disclosed in PTL 3, the coating layer to be partially peeled has a small thickness, and the resulting uneven structure is difficult to feel the texture.

The present invention has been made under such circumstances, and an object of the present invention is to provide a decorative material having a stereoscopic visual effect and a better feel, and a method for producing the same.

Solution to Problem

An object of the present invention is to provide the following [1] and [2]. [1] A decorative material comprising at least a base material; and a first region and a second region within a plane of the decorative material when seen in planar view, wherein the first region includes a peelable ink decoration layer disposed on the base material and a first recess formed immediately above the peelable ink decoration layer, and the second region includes a second recess deeper than the first recess. [2] A method for producing the decorative material according to [1], the method comprising the steps (1) to (7);

(1) a step of providing a base material;
(2) a step of obtaining a laminate A by forming a peelable ink decoration layer on part of the base material;
(3) a step of obtaining a laminate B by impregnating the laminate A with a curable resin composition to form an uncured curable resin composition layer on the entire surface of the laminate A including the peelable ink decoration layer;
(4) a step of obtaining a laminate C by disposing a reinforcing layer on the base material side of the laminate B and disposing a releasing film on the uncured curable resin composition layer side of the laminate B;
(5) a step of heat pressing the laminate C in the state where a mirror plate is disposed on the reinforcing layer side of the laminate C and an embossing plate is disposed on the releasing film side of the laminate C, thereby curing the uncured curable resin composition layer to form a cured product layer, and forming a second recess with the embossing plate, the second recess reaching a position in the thickness direction deeper than the vertex portion of the peelable ink decoration layer in the laminate C;
(6) a step of extracting the laminate C from between the mirror plate and the embossing plate; and
(7) a step of removing the releasing film and the cured product layer on the peelable ink decoration layer when the releasing film is peeled and removed from the laminate C, to form a first region having a first recess formed immediately above the peelable ink decoration layer and a second region having a residue of the cured product layer and the second recess.

Advantageous Effects of Invention

The present invention can provide a decorative material having a stereoscopic visual effect and a better feel. According to the present invention, the decorative material can be readily produced in a simple manner.

DESCRIPTION OF EMBODIMENT

[Decorative Material]

The decorative material according to the present invention is a decorative material comprising at least a base material; and a first region and a second region within a plane of the decorative material when seen in planar view. The first region includes a peelable ink decoration layer disposed on the base material and a first recess formed immediately above the peelable ink decoration layer, and the second region includes a second recess deeper than the first recess.

In the present invention, the term "seen in planar view" means that the decorative material according to the present invention is seen in a planar direction from the side of the first recess and the second recess (surface side) (seen from the x-y plane in FIGS. 1 to 6).

Figure 1:
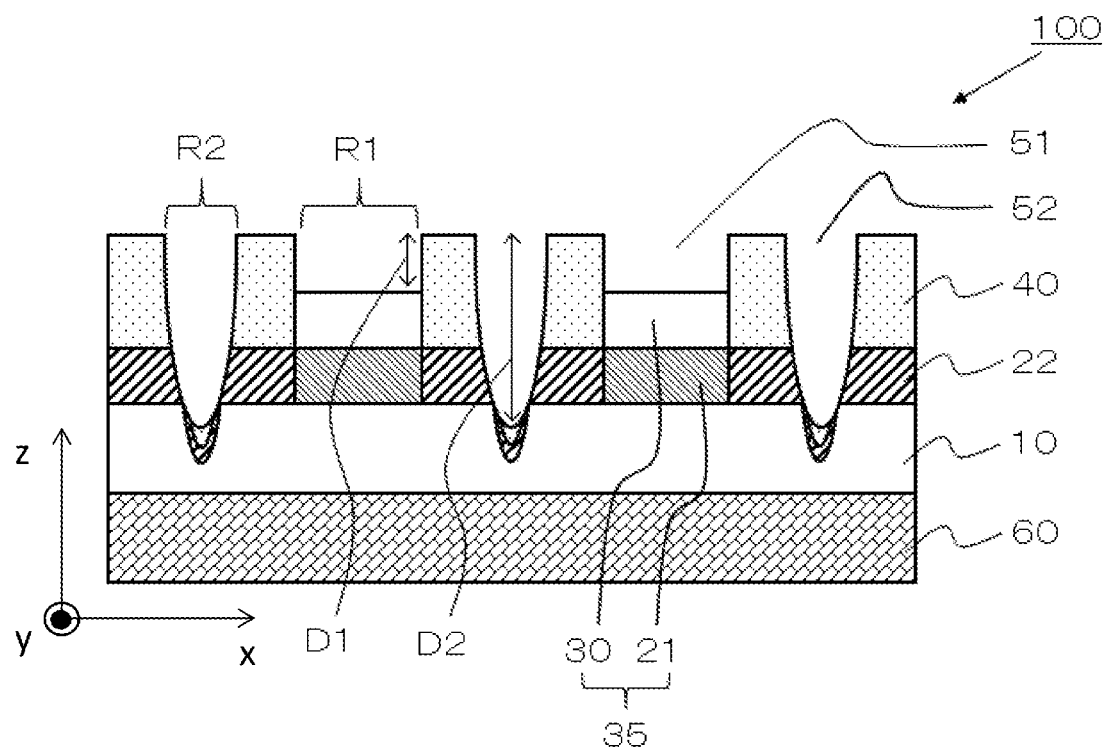
FIG. 1 is a cross-sectional view showing a decorative material according to one embodiment of the present invention.

FIG. 1 is a cross-sectional view showing a decorative material 100 according to one embodiment of the present invention in the x-z direction.

Seen in planar view of the decorative material 100, the decorative material 100 shown in FIG. 1 includes a base material 10, and includes a first region R1 and a second region R2 within the plane of the decorative material 100. In the decorative material 100 shown in FIG. 1, the first region R1 includes a peelable ink decoration layer 35 disposed on the base material 10 and a first recess 51 formed immediately above the peelable ink decoration layer, and the second region R2 includes a second recess 52 deeper than the first recess. In the decorative material 100 shown in FIG. 1, the peelable ink decoration layer 35 is formed of the first decoration layer 21 and a first cured product layer 30. In the decorative material 100 shown in FIG. 1, the second region R2 includes a second decoration layer 22 disposed on the base material 10 and a second cured product layer 40 disposed on the second decoration layer. The decorative material 100 shown in FIG. 1 also includes a reinforcing layer 60 on the surface of the base material 10 opposite to that including the peelable ink decoration layer 35.

<Base Material>

Any base material can be used, and may be appropriately selected according to desired performance. Preferred examples thereof include paper base materials, fiber base materials, and resin base materials from the viewpoint of handling properties. Among these, more preferred are paper base materials and fiber base materials which can have higher mechanical physical properties through impregnation with a curable resin, and still more preferred are paper base materials.

Examples of the paper base materials include Kraft paper, titanium paper, cotton linter paper, resin impregnated paper, tissue paper, and Japanese paper.

Examples of the fiber base materials include fiber base materials composed of inorganic fibers such as glass fibers, alumina fibers, silica fibers, and carbon fibers; fiber base materials composed of organic fibers made of a variety of synthetic resins such as polyester, acrylic, polyethylene, and polypropylene resins; and composite base materials thereof. The fiber base material may be a non-woven fabric, or may be a woven fabric.

The base material can have any thickness, and may be appropriately selected according to desired performance. From the viewpoint of mechanical physical properties ensured and handling properties, the thickness is usually about 10 to 150 µm, preferably 20 to 120 µm, more preferably 30 to 100 µm. If a paper base material is used as the base material, from the same viewpoint, the basis weight is usually about 20 to 150 g/m², preferably 30 to 100 g/m².

If the base material is a base material having liquid permeability, such as a paper base material and a fiber base material, these base materials are preferably impregnated with a curable resin. Such a configuration enhances the mechanical strength of the decorative material according to the present invention.

The curable resin to be used can be curable resins such as thermosetting resins and ionizing radiation curable resins. Preferred are thermosetting resins from the viewpoint of handling properties.

Preferably, the curable resin is uncured before formation of the first recess and the second recess, and is cured during the process of forming the second recess (step (5) described later).

To further improve the feel of the decorative material and enhance the mechanical strength of the decorative material, preferred curable resins impregnated into the base material are melamine resins, urea resins, melamine-urea resins, guanamine resins, sulfonamide resins, diallyl phthalate resins, polyester resins, phenol resins, epoxy resins, aminoalkyd resins, silicon resins, and polysiloxane resins. Among these, preferred are thermosetting resins such as melamine resins, urea resins, melamine-urea resins, phenol resins, guanamine resins, and sulfonamide resins. Among these thermosetting resins, preferred are melamine resins, melamine-urea resins, and phenol resins, and particularly preferred are melamine resins.

Examples of a method of impregnating the thermosetting resin into the base material having liquid permeability include a method of preparing an uncured thermosetting resin composition, and impregnating the composition into the base material. The impregnated composition is heated and cured into a cured product of thermosetting resin at an appropriate point of time by a reaction such as a crosslinking reaction or a polymerization reaction.

In this specification, when simply referred to as "thermosetting resin", it indicates a cured product prepared by curing an uncured product of the thermosetting resin. The same is applied to other curable resins such as ionizing radiation curable resins.

In this specification, when referred to as curable resin composition, thermosetting resin composition, or ionizing radiation curable resin composition, it means that they are uncured unless otherwise specified.

To enhance interlayer adhesion between the base material and other layers forming the decorative material and strengthen the adhesiveness to an adherend, one or both surfaces of the base material may be subjected to a surface treatment such as a physical surface treatment (such as an oxidation method or a surface roughening method) or a chemical surface treatment, or may have a primer layer formed thereon.

Examples of the oxidation method include a corona discharge treatment, a chromium oxidation treatment, a flame treatment, a hot air treatment, and an ozone-ultraviolet light treatment. Examples of the surface roughening method include sandblasting and solvent treatment. These surface treatments are appropriately selected according to the type of the base material. In general, the corona discharge treatment is preferably used from the viewpoint of the effect and operationability of the surface treatment.

<Region>

The decorative material according to the present invention includes the first region and the second region within a plane of decorative material when seen in planar view. Furthermore, in the decorative material according to the present invention, the first region includes a peelable ink decoration layer disposed on the base material and the first recess formed immediately above the peelable ink decoration layer, and the second region includes the second recess deeper than the first recess.

The first recess mainly has a role to provide a stereoscopic visual effect to the decorative material, and the second recess mainly has a role to impart a texture to the decorative material. Accordingly, the decorative material according to the present invention including the first recess and the second recess can have a better stereoscopic visual effect and a better feel.

Figure 6:
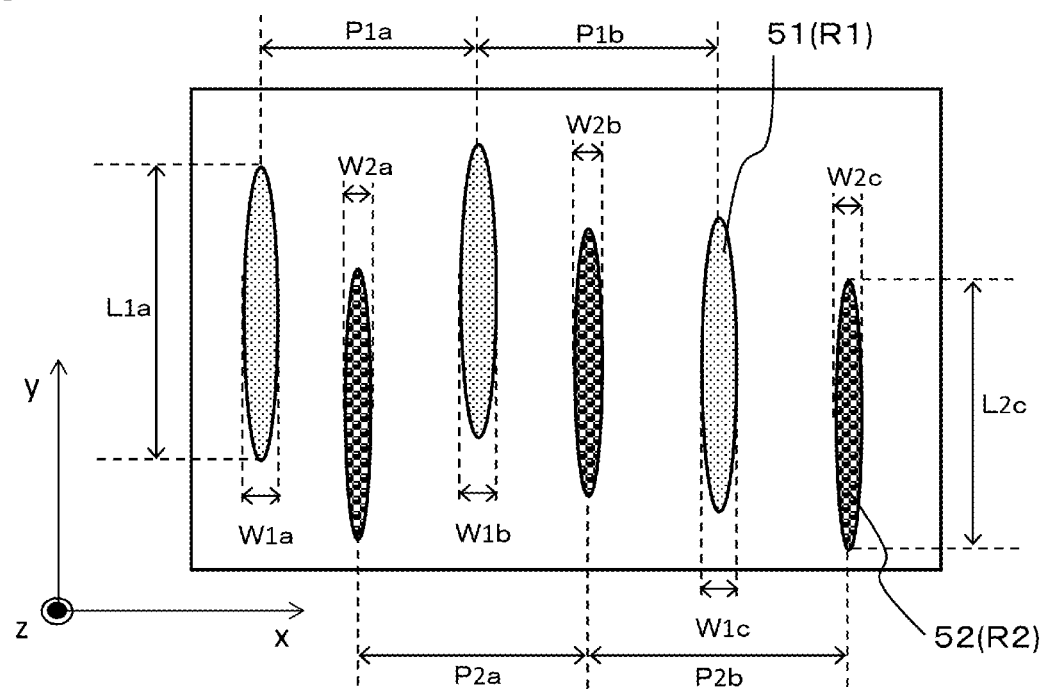
FIG. 6 is a plan view showing a decorative material according to one embodiment of the present invention.

The decorative material according to the present invention may also include other regions than the first region and the second region. In FIGS. 1 and 6, portions excluding the first region R1 and the second region R2 correspond to the other regions.

As shown in FIG. 6, the decorative material preferably includes a plurality of mutually independent first regions R1 within the plane. Similarly, the decorative material preferably includes a plurality of mutually independent second regions R2 within the plane.

The decorative material having such mutually independent first regions R1 and mutually independent second regions R2 within the plane can have a better stereoscopic visual effect and a better feel.

The decorative material according to the present invention preferably satisfies at least one of the following expressions (1) to (3):

$$0.1 \leq W2/W1 \leq 1.0 \quad (1)$$

$$0.1 \leq P2/P1 \leq 1.0 \quad (2)$$

$$0.1 \leq L2/L1 \leq 1.0 \quad (3)$$

wherein where the average width of the first recess is defined as W1, the interval of the first recess in the transverse direction is defined as P1, the average length of the first recess is defined as L1, the average width of the second recess is defined as W2, the interval of the second recess in the transverse direction is defined as P2, and the average length of the second recess is defined as L2.

The satisfaction of at least one of the expression (1) to (3) above means that the shape (width, interval, and/or length) of the first recess is not significantly different from that of the second recess.

The first recess mainly has a role to provide the stereoscopic visual effect to the decorative material. More specifically, the first recess looks recessed by matting the bottom surface of the first recess or by matching the first recess with a dark portion of the decoration layer (first decoration layer described later), thereby providing the stereoscopic visual effect to the decorative material. In contrast, the second recess mainly has a role to impart a recessed texture. Accordingly, if the shape of the first recess is significantly different from that of the second recess, people, who touch the surface of the decorative material by fingers, have a sense of deviation caused by the difference between the look of the design and the texture. However, if at least one of the expressions (1) to (3) is satisfied, such a sense of deviation caused by the difference between the look and the texture can be reduced.

The sense of deviation is more likely to be felt when people touch the recess in a perpendicular direction thereof. Thus, among the expressions (1) to (3), it is more preferred that one of the (1) and (2) be satisfied, and it is still more preferred that both of the (1) and (2) be satisfied. It is further still more preferred that all the expressions (1) to (3) be satisfied.

For the expression (1), W2/W1 is more preferably 0.1 or more and 0.7 or less, still more preferably 0.1 or more and 0.5 or less, further still more preferably 0.1 or more and 0.4 or less.

For the expression (2), P2/P1 is more preferably 0.1 or more and 0.7 or less, still more preferably 0.1 or more and 0.5 or less, further still more preferably 0.1 or more and 0.4 or less.

For the expression (3), L2/L1 is more preferably 0.1 or more and 0.7 or less, still more preferably 0.1 or more and 0.6 or less.

Moreover, the decorative material according to the present invention preferably satisfies at least one of the following expressions (A1) to (A3) where W2/W1 is defined as "Wr", P2/P1 is defined as "Pr", and L2/L1 is defined as "Lr":

$$0.2 \leq Wr/Pr \leq 3.0 \quad (A1)$$

$$0.2 \leq Wr/Lr \leq 3.0 \quad (A2)$$

$$0.2 \leq Pr/Lr \leq 3.0 \quad (A3)$$

If at least one of the expressions (A1) to (A3) is satisfied, the shape of the first recess (width, interval, and/or length) becomes close to that of the second recess, reducing the sense of deviation caused by the difference between the look and the texture.

The sense of deviation is more likely to be felt when people touch the recess in a perpendicular direction thereof. Thus, among the expressions (A1) to (A3), it is more preferred that the expression (A1) be satisfied. It is still more preferred that the expression (A1) and one of the expressions (A2) and (A3) be satisfied, and it is further still more preferred that all the expressions (A1) to (A3) be satisfied.

For the expression (A1), Wr/Pr is more preferably 0.3 or more and 2.0 or less, still more preferably 0.5 or more and 1.5 or less, further still more preferably 0.7 or more and 1.3 or less.

For the expression (A2), Wr/Lr is more preferably 0.2 or more and 2.0 or less, still more preferably 0.3 or more and 1.5 or less.

For the expression (A3), Pr/Lr is more preferably 0.2 or more and 2.0 or less, still more preferably 0.3 or more and 1.5 or less.

In the case of FIG. 6, the average width W1 of the first recess, the interval P1 of the first recess in the transverse direction, the average width W2 of the second recess, and the interval P2 of the second recess in the transverse direction can be calculated from the following expressions:

$$W1 = (W1a + W1b + W1c)/3$$

$$P1 = (P1a + P1b + P1c)/3$$

$$W2 = (W2a + W2b + W2c)/3$$

$$P2 = (P2a + P2b + P2c)/3$$

In the case of FIG. 6, where the length of the first recess and the length of the second recess are partially omitted, the average lengths thereof can be calculated according to the expressions above as follows:

$$L1 = (L1a + L1b + L1c)/3$$

$$L2 = (L2a + L2b + L2c)/3$$

Although FIG. 6 is referred to in this paragraph and the values of W1, P1, L1, W2, P2, and L2 are each calculated as an average thereof in three recesses, it is preferred that the averages thereof in any 10 recesses be calculated.

If the shape of the first recess and/or that of the second recess is amorphous and the widths, intervals, and lengths of individual recesses are varied according to their positions, the maximum values are defined as the width, interval, and length of each recess.

Although the ranges of the absolute values of W1, P1, L1, W2, P2, and L2 are not particularly limited and can be determined according to a design to be expressed, approximately the following ranges are preferred.

W1 is preferably 50 to 400 mm, more preferably 150 to 300 mm.

P1 is preferably 50 to 350 mm, more preferably 100 to 250 mm.

L1 is preferably 500 to 1500 mm, more preferably 750 to 1250 mm.

W2 is preferably 20 to 100 mm, more preferably 30 to 80 mm.

P2 is preferably 10 to 100 mm, more preferably 20 to 60 mm.

L2 is preferably 100 to 1000 mm, more preferably 300 to 600 mm.

The decorative material according to the present invention preferably satisfies the following expression (4) wherein the total area of the first region is defined as S1 and the total area of the second region is defined as S2.

$$S2/S1 \leq 1.0 \quad (4)$$

If the proportion of the area of the second region is larger, the decorative sheet is whitened, and is likely to look white as a whole. For this reason, whitening of the decorative sheet can be suppressed if the expression (4) is satisfied. Such suppression of whitening of the decorative sheet is also preferred because it leads to maintenance of the stereoscopic visual effect.

For the expression (4), S2/S1 is preferably 0.9 or less, more preferably 0.8 or less, still more preferably 0.7 or less.

If S2/S1 is significantly small, the sense of deviation caused by the difference between the look and the texture is likely to increase. For this reason, for the expression (4), S2/S1 is preferably 0.3 or more, more preferably 0.4 or more.

The total area "S1" of the first region and the total area "S2" of the second region are the areas when the decorative material is seen in planar view.

Where the total area of the decorative material when seen in planar view is defined as "S", S1/S is preferably 0.05 to 0.6, more preferably 0.05 to 0.4. By controlling S1/S to fall within the range, the proportion of the area of the first recess which looks recessed is well-balanced, readily providing the stereoscopic visual effect.

S2/S is preferably 0.01 to 0.5, more preferably 0.01 to 0.35. Control of S2/S within the range can facilitate a reduction in the sense of deviation caused by the look and the texture while the texture is imparted to the decorative material.

The arrangement direction of the first recess is preferably approximately parallel to the arrangement direction of the second recess. Such a configuration can reduce the sense of deviation caused by the look and the texture.

The expression "arrangement direction of the first recess is approximately parallel to the arrangement direction of the second recess" indicates that the angle formed by the arrangement direction of the first recess and the arrangement direction of the second recess is 10 degrees or less. The angle is preferably 5 degrees or less, more preferably 3 degrees or less. The arrangement direction of the first recess indicates the long side direction of the first recess, and the arrangement direction of the second recess indicates the long side direction of the second recess.

Where the average depth of the first recess is defined as D1, D1 is preferably 0.1 to 20 µm, more preferably 0.1 to 10 µm.

Control of D1 to 0.1 µm or more can facilitate recognition of the first recess such that it looks recessed, and control of D1 to 10 µm or less can facilitate formation of the first recess.

Where average depth of the second recess is defined as D2, D2 is preferably 20 µm or more, more preferably 40 µm or more. Control of D2 to 40 µm or more can facilitate an improvement in texture.

A significantly deep D2 obstructs formation of the second recess. For this reason, D2 is preferably 150 µm or less, more preferably 100 µm or less.

In this specification, preferably, D1 and D2 each are calculated as the average depth of any 10 recesses. The depth of each recess indicates the maximum depth of the recess.

The decorative material according to the present invention preferably satisfies the relation represented by Ra2<Ra1 wherein the arithmetic average roughness of the bottom surface of the first recess is defined as Ra1, and the arithmetic average roughness of the bottom surface of the second recess is defined as Ra2. Such a configuration can facilitate demonstration of the stereoscopic visual effect in the decorative material.

Ra1 is preferably 0.2 to 0.6 µm, more preferably 0.3 to 0.5 µm. Control of Ra1 to 0.2 µm or more can facilitate demonstration of the stereoscopic visual effect in the decorative material, and control of Ra1 to 0.6 µm or less can suppress the whity look of the first recess (first region).

Ra2 is preferably 0.05 to 0.5 µm, more preferably 0.2 to 0.4 µm. Control of Ra2 to 0.05 µm or more can facilitate suppression of regular reflection in the second recess (second region), and control of Ra2 to 0.5 µm or less can suppress the whity look of the second recess (second region).

In this specification, the arithmetic average roughness indicates the arithmetic average roughness in accordance with JIS B0601:2013 where the cutoff value is 0.8 mm. Ra1 and Ra2 each indicate the average of values measured at any 10 places.

<First Region>

As described above, the first region includes the peelable ink decoration layer disposed on the base material, and the first recess formed immediately above the peelable ink decoration layer.

<<Peelable Ink Decoration Layer>>

The surface of the peelable ink decoration layer has releasing properties.

Due to the releasing properties of the surface of the peelable ink decoration layer, the second cured product layer on the peelable ink decoration layer is mostly peeled off. Preferably, the second cured product layer on the peelable ink decoration layer is completely peeled off to improve the stereoscopic visual effect derived from the surface uneven structure; however, often, the second cured product layer cannot be completely peeled off from the peelable ink decoration layer. For this reason, a trace of second cured product layer may remain on the peelable ink decoration layer in the range not inhibiting the advantageous effect of the present invention.

Examples of the peelable ink decoration layer include a monolayer structure of the first cured product layer. The peelable ink decoration layer preferably has a laminate structure preferably including the first decoration layer and first cured product layer disposed in sequence from the base material.

<<<First Cured Product Layer>>>

The first cured product layer is a layer formed of a curable resin, more specifically, a layer formed of a cured product of an uncured curable resin composition.

To provide designability of a better feel and higher surface properties, preferred curable resins are thermosetting resins and ionizing radiation curable resins. Ionization radiation curable resins are more preferred.

Preferred examples of the thermosetting resins can include the same thermosetting resins as those exemplified above as thermosetting resins which can be impregnated into the base material.

The ionizing radiation curable resin is a resin which is cross-linked and cured through irradiation of ionizing radiation, and has an ionizing radiation-curable functional group. Here, the ionizing radiation-curable functional group indicates a group which is cross-linked and cured through irradiation of ionizing radiation, and preferred examples thereof include functional groups having an ethylenic double bond, such as an (meth)acryloyl group, a vinyl group, and an allyl group. The ionizing radiation indicates electromagnetic waves or charged particle beams which have energy quantums which can polymerize or cross-link molecules. Usually, ultraviolet light (UV) or an electron beam (EB) is used. Besides, the ionizing radiation also includes electromagnetic waves such as X-rays and γ-rays, α-rays, and ion beams.

Specifically, the ionizing radiation curable resin can be appropriately selected from polymerizable monomers and polymerizable oligomers usually used as ionizing radiation curable resins in the related art.

Preferred polymerizable monomers are (meth)acrylate monomers having a radical polymerizable unsaturated group in the molecule. Among these, polyfunctional (meth)acrylate monomers are preferred. Here, "(meth)acrylate" indicates "acrylate or methacrylate".

Examples of the polyfunctional (meth)acrylate monomers include (meth)acrylate monomers having two or more ionizing radiation-curable functional groups in the molecule and having at least an (meth)acryloyl group as the functional group. Preferred are acrylate monomers having an acryloyl group to provide designability of a better feel and higher surface properties.

To provide designability of a better feel and higher surface properties, the number of functional groups is preferably 2 or more, and the upper limit is preferably 8 or less, more preferably 6 or less, still more preferably 4 or less, particularly preferably 3 or less. These polyfunctional (meth)acrylates may be used alone or in combination.

Preferred examples of such polymerizable monomers include bifunctional (meth)acrylates such as ethylene glycol di(meth)acrylate, bisphenol A tetraethoxy diacrylate, bisphenol A tetrapropoxy diacrylate, and 1,6-hexanediol diacrylate; and tri- or higher functional (meth)acrylates such as trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and isocyanurate-modified tri(meth)acrylate. To provide designability of a better feel and higher surface properties, among these, preferred are dipentaerythritol polymerizable monomers such as dipentaerythritol tetra(meth)acrylate, dipentaerythritol penta(meth)acrylate, and dipentaerythritol hexa(meth)acrylate; more preferred are dipentaerythritol penta(meth)acrylate and dipentaerythritol hexa(meth)acrylate; and particularly preferred is a combination of dipentaerythritol penta(meth)acrylate with dipentaerythritol hexa(meth)acrylate.

Examples of the polymerizable oligomers include (meth)acrylate oligomers having two or more ionizing radiation-curable functional groups in the molecule and having at least an (meth)acryloyl group as the functional group. Examples thereof include urethane (meth)acrylate oligomers, epoxy (meth)acrylate oligomers, polyester (meth)acrylate oligomers, polyether (meth)acrylate oligomers, polycarbonate (meth)acrylate oligomers, acrylic (meth)acrylate oligomers, polycaprolactone urethane (meth)acrylate oligomers, and polycaprolactone diol urethane (meth)acrylate.

To provide designability of a better feel and higher surface properties, the number of functional groups in these polymerizable oligomers is preferably 2 or more, and the upper limit is preferably 8 or less, more preferably 6 or less, still more preferably 4 or less, particularly preferably 3 or less.

To provide designability of a better feel and higher surface properties and facilitate formation of the first cured product layer, these polymerizable oligomers have a weight average molecular weight of preferably 500 or more, more preferably 1,000 or more, and the upper limit is preferably 80,000 or less, more preferably 50,000 or less. In this specification, the weight average molecular weight is the average molecular weight obtained from measurement by GPC analysis and conversion against standard polystyrenes.

The first cured product layer preferably contains a mold release agent. Because the mold release agent is contained, a different resin laminated on the surface of the peelable ink decoration layer (surface of the first cured product layer) can be peeled off. On the other hand, the different resin adheres to the second region and is not peeled therefrom, thus facilitating formation of the first recess.

Examples of the mold release agent include fluorinated mold release agents and silicone mold release agents. To provide designability of a better feel, preferred are silicone mold release agents.

Examples of the silicone mold release agents include those having a polysiloxane structure as a basic structure. Among these, preferred are modified silicone oils having an organic group introduced into at least one of their side chain and terminals, and more preferred are modified silicone oils having an organic group introduced into both terminals. To provide designability of a better feel, preferred examples of the organic group include reactive functional groups such as an (meth)acrylic group, an amino group, an epoxy group, a mercapto group, a carbinol group, a phenol group, and a carboxyl group; and non-reactive group functional groups such as a polyether group, an aralkyl group, a fluoroalkyl group, an alkyl group, a fatty acid amide group, and a phenyl group. Among these, preferred are reactive functional groups, and particularly preferred is an (meth)acrylic group. In other words, particularly preferred is (meth)acrylic modified silicone oil. These organic groups may have a substituent such as a nitrogen atom, a sulfur atom, a hydroxyl group, or an alkyl group.

The content of the mold release agent is preferably 0.1 to 5 parts by mass, more preferably 0.5 to 3 parts by mass, still more preferably 1 to 2 parts by mass relative to 100 parts by mass of the curable resin which form the first cured product layer. If the content of the mold release agent is within this range, the effect of adding the mold release agent is efficiently obtained.

The first cured product layer preferably contains an inorganic filler. The inorganic filler contained in the first cured product layer creates a uneven structure on the bottom surfaces of the first recesses, thus providing a decorative material having a higher stereoscopic visual effect.

Examples of the inorganic filler include particles made of inorganic materials such as oxides such as aluminum oxide, magnesium oxide, silica, calcium oxide, titanium oxide, zinc oxide, and zirconia oxide; hydroxides such as aluminum hydroxide, magnesium hydroxide, and calcium hydroxide; carbonates such as magnesium carbonate and calcium carbonate; sulfates such as calcium sulfate and barium sulfate; and silicates such as magnesium silicate, aluminum silicate, calcium silicate, and aluminosilicic acid. Among these, preferred are oxides such as aluminum oxide, magnesium oxide, silica, calcium oxide, titanium oxide, and zinc oxide, and particularly preferred is silica.

To facilitate control of Ra1 within the range specified above, the inorganic filler has an average particle size of preferably 0.3 to 20 μm, more preferably 0.5 to 10 μm. In this specification, the average particle size of the filler is a value obtained from measurement by a laser diffraction scattering method.

To facilitate control of Ra1 within the range specified above, the content of the inorganic filler is preferably 1 to 50 parts by mass, more preferably 10 to 40 parts by mass, still more preferably 20 to 35 parts by mass relative to 100 parts by mass of the curable resin which forms the first cured product layer. If the content of the inorganic filler is within this range, the effect of adding the inorganic filler is efficiently obtained.

The first cured product layer can have any thickness. To more readily provide designability of a better feel, the thickness is usually about 0.1 to 20 μm, preferably 0.5 to 10 μm, more preferably 1 to 5 μm.

<<Decoration Layer (First Decoration Layer, Second Decoration Layer)>>

The first decoration layer 21 is a layer suitably formed within the first region R1 as part of the layers which form the peelable ink decoration layer 35. The first decoration layer 21 is located at a position corresponding to the first cured product layer 30 within the plane of the decorative material when seen in planar view.

The second decoration layer is a decoration layer suitably formed within the regions (second region and other regions) other than the first region.

The decoration layer may be a monolayer, or may be a multi-layer.

Examples of the multi-layer include those having a configuration including a solid printing layer formed as a background and a decoration layer laminated on the solid printing layer.

The decoration layer may be formed by multi-color printing using a plurality of plates. For example, the first decoration layer may be formed with a plate A, and the second decoration layer may be formed with a plate B.

Examples of the pattern given by the decoration layer include, but should not be limited to, patterns of wood materials, stones, tiles, bricks, clothes, and leathers. Among these, preferred are patterns of wood materials because the advantageous effects of the prevent invention can be strongly recognized.

If the design created by the decoration layer is a pattern of a wood material, the first decoration layer preferably has at least one pattern selected from the group consisting of duct, latewood, and knot patterns. In other words, the first regions preferably form at least one pattern selected from the group consisting of duct, latewood, and knot patterns in the wood material. The duct is a cylindrical cell through which water passes. To human eyes, an arrangement of tiny ducts looks like a picture pattern of a dark color formed along the arrangement. The latewood indicates a narrow and dark portion formed from summer to fall. The wide portion formed from spring to summer is referred to as earlywood. The rings of a wood are formed of the earlywood and the latewood alternately repeated. The knot is a trace of a branch taken into a trunk, and has a shape close to a circular or oval shape and a color darker than those of its surrounding tissues.

If the design created by the decoration layer is a pattern derived from a stone such as travertine, the first decoration layer preferably has a concave pattern. In other words, the first regions preferably form a concave pattern as shown in a stone.

If the design created by the decoration layer is a pattern of a tile or a brick, the first decoration layer preferably has a joint pattern. In other words, the first regions preferably form a tile or brick joint pattern.

If the design created by the decoration layer is a cloth pattern, the first decoration layer preferably has concave threads. In other words, the first regions preferably form concave threads as in a cloth.

If the design created by the decoration layer is a leather pattern, the first decoration layer preferably has wrinkle-like recesses. In other words, the first regions preferably form wrinkle-like recess as in a leather.

Such a design created by the first decoration layer can facilitate recognition of the first recess such that it looks recessed, providing a higher stereoscopic visual effect.

The decoration layer can be formed by printing using an ink for a decoration layer containing a pigment and a binder resin, for example.

The decoration layer has a thickness of preferably 0.5 to 20 μm, more preferably 1 to 10 μm, still more preferably 2 to 8 μm. If the decoration layer is a multi-layer, the thickness of each layer is preferably within the range above.

<Second Region>

As described above, the second region has a second recess deeper than the first recess.

Examples of the configuration of the second region include that in which a monolayer of the second cured product layer is disposed on the base material. A preferred configuration of the second region is a laminate of the second decoration layer disposed on the base material and the second cured product layer disposed on the second decoration layer.

Although the decorative material according to the present invention may include the peelable ink decoration layer within the second region (may include the peelable ink decoration layer in the portion including the second recess), it is preferred that the peelable ink decoration layer be substantially not included within the second region. In other words, it is preferred that the portion including the second recess substantially not include the peelable ink decoration layer.

The peelable ink decoration layer has properties to facilitate peel off of another resin, even if disposed thereon. Accordingly, even if the second recess is formed in the state where another resin is disposed on the peelable ink decoration layer, another resin is basically peeled off, thus losing one half of the effect of forming the second recess. If the second recess is formed on the portion including the peelable ink decoration layer, the releasing properties of the peelable ink decoration layer may reduce to cause failures such as partial peel when another resin is peeled off in some cases. Thus, as described above, it is preferred that the peelable ink decoration layer be substantially not included within the second region.

The expression "the peelable ink decoration layer is substantially not included within the second region" means that $S2'/S2$ is 0.20 or less where the total area of the second region is defined as $S2$ and the total area of the second region including the peelable ink decoration layer is defined as $S2'$. $S2'/S2$ is preferably 0.10 or less, more preferably 0.05 or less.

<<Second Cured Product Layer>>

The second cured product layer is a cured product layer formed of a curable resin, and is also a layer which provides a projected shape to the decorative material.

The second cured product layer is a layer formed of a curable resin, more specifically, a layer formed of a cured product of an uncured curable resin composition. To provide designability of a better feel, preferred examples of the curable resin include thermosetting resins and ionizing radiation curable resins. Thermosetting resins are more preferred. These curable resins may be used alone or in combination. For example, a combination of a thermosetting resin with an ionizing radiation curable resin may be used, or combinations of these curable resins with a thermoplastic resin may be used.

Preferred examples of the thermosetting resin can include the same thermosetting resins as those exemplified above as the thermosetting resin which can be impregnated into the base material. Similarly to above, the variety of thermosetting resins above are preferred, and melamine resins are particularly preferred. Use of such a curable resin can provide designability of a better feel, and enhance the adhesion to the base material to provide higher mechanical strength. Examples of the ionizing radiation curable resin include the same as those which can be used in the first cured product layer.

If the curable resin is used in combination with the thermoplastic resin, the content of the curable resin in the total resins is usually about 50 mass % or more and less than 100 mass %, preferably 60 mass % or more and 90 mass % or less.

The difference ($T2-T1$) between the thickness ($T2$) of the second cured product layer and the thickness ($T1$) of the first cured product layer corresponds to the depth $D1$ of the first recess.

For this reason, the thickness ($T2$) of the second cured product layer is preferably controlled such that $D1$ falls within the range above. The second cured product layer has a thickness ($T2$) in the range of usually about 1 to 50 μm, preferably 3 to 40 μm, more preferably 5 to 30 μm.

<Reinforcing Layer>

The decorative material according to the present invention preferably includes a reinforcing layer on the surface of the base material opposite to the surface including the peelable ink decoration layer to reinforce the decorative material.

In particular, if a fiber base material or paper base material impregnated with a thermosetting resin is used as a base material, the reinforcing layer used in combination can provide a thermosetting resin decorative plate having higher mechanical physical properties.

Examples of the reinforcing layer include thermosetting resin-impregnated sheets.

Any fiber base material and paper base material can be used in thermosetting resin-impregnated sheets without limitation as long as they are fiber base materials and paper base materials for the base material exemplified above. The basis weight is preferably 100 to 300 g/m$^2$, more preferably 150 to 250 g/m$^2$. Any thermosetting resin can be used without limitation as long as it can be impregnated in the form of a thermosetting resin composition into the base material. Phenol resins are preferred. In other words, the reinforcing layer is preferably a phenol resin-impregnated paper.

The phenol resin-impregnated paper preferably used is those prepared by impregnating a sheet of Kraft paper having a basis weight of 150 to 250 g/m$^2$ with a phenol resin at an impregnation rate of about 20 to 60% dried at 100 to 140° C., for example.

<Primer Layer>

In the decorative material according to the present invention, a primer layer can be disposed between layers to enhance the adhesion therebetween.

Examples of the resin material for forming the primer layer include urethane resins, polyester resins, acrylic resins, acrylic urethane resins, and vinyl chloride-vinyl acetate copolymer resins. To efficiently provide high adhesion, the primer layer has a thickness of usually about 0.1 to 15 μm, preferably 1 to 10 μm.

<Adherend>

The decorative material according to the present invention may include an adherend laminated on and integrated with the rear surface of the base material (surface of the base material opposite to that including the peelable ink decoration layer).

Examples of the adherend include wood boards such as wood single boards, plywood boards, particle boards, medium-density fiberboards (MDF), and laminated woods; gypsum-based boards such as gypsum boards and gypsum slag boards; cement boards such as calcium silicate boards, asbestos slate boards, light-weight foam concrete boards, and hollow extruded cement boards; fiber cement boards such as pulp cement boards, asbestos cement boards, and wood chip cement boards; ceramic boards such as earthenware, porcelain, clay, glass, and enameled boards; metal plates such as iron plates, zinc plated steel sheets, polyvinyl chloride sol-coated steel sheets, aluminum plates, and copper plate; thermoplastic resin plates such as polyolefin resin plates, acrylic resin plates, ABS plates, and polycarbonate plates; thermosetting resin plates such as phenol resin plates, urea resin plates, unsaturated polyester resin plates, polyurethane resin plates, epoxy resin plates, and melamine resin plates; and so-called FRP plates made of composites of resins (such as phenol resins, urea resins, unsaturated polyester resins, polyurethane resins, epoxy resins, melamine resins, and diallyl phthalate resins) impregnated into glass fiber non-woven fabrics, fabrics, paper, and other various fibrous base materials. These may be used alone, or may be used as a composite of a combination thereof laminated.

The various adherends can be laminated on the base material by any method. For example, a method of bonding a sheet to an adherend with an adhesive can be used. The adhesive may be appropriately selected from known adhesives according to the type of adherend. Examples thereof include polyvinyl acetate, polyvinyl chloride, vinyl chloride-vinyl acetate copolymers, ethylene-acrylic acid copolymers, ionomers, butadiene-acrylic nitrile rubbers, neoprene rubbers, and natural rubbers.

<Application of Decorative Material>

The decorative material according to the present invention can be used in top boards for a variety of countertops and desks; furniture; cabinets for kitchen products; and home construction materials such as doors, for examples. Among these, the members having a horizontal surface, such as top boards for a variety of countertops and desks, should have the stereoscopic visual effect and a good texture which matches with the look of the design. Thus, the decorative material according to the present invention is preferably used in such members because it readily demonstrates the effect of the decorative plate according to the present invention.

[Method for Producing Decorative Material]

The method for producing the decorative material according to the present invention comprises the following steps (1) to (7):

(1) a step of providing a base material;
(2) a step of obtaining a laminate A by forming a peelable ink decoration layer on part of the base material;
(3) a step of obtaining a laminate B by impregnating the laminate A with a curable resin composition to form an uncured curable resin composition layer on the entire surface of the laminate A including the peelable ink decoration layer;
(4) a step of obtaining a laminate C by disposing a reinforcing layer on the base material side of the laminate B and disposing a releasing film on the uncured curable resin composition layer side of the laminate B;
(5) a step of heat pressing the laminate C in the state where a mirror plate is disposed on the reinforcing layer side of the laminate C and an embossing plate is disposed on the releasing film side of the laminate C, thereby curing the uncured curable resin composition layer to form a cured product layer, and forming a second recess with the embossing plate, the second recess reaching a position in the thickness direction deeper than the vertex portion of the peelable ink decoration layer in the laminate C;
(6) a step of extracting the laminate C from between the mirror plate and the embossing plate; and
(7) a step of removing the releasing film and the cured product layer on the peelable ink decoration layer when the releasing film is peeled and removed from the laminate C, to form a first region having a first recess formed immediately above the peelable ink decoration layer and a second region having a residue of the cured product layer and the second recess.

The step (1) is a step of providing the base material 10.

Figure 2:
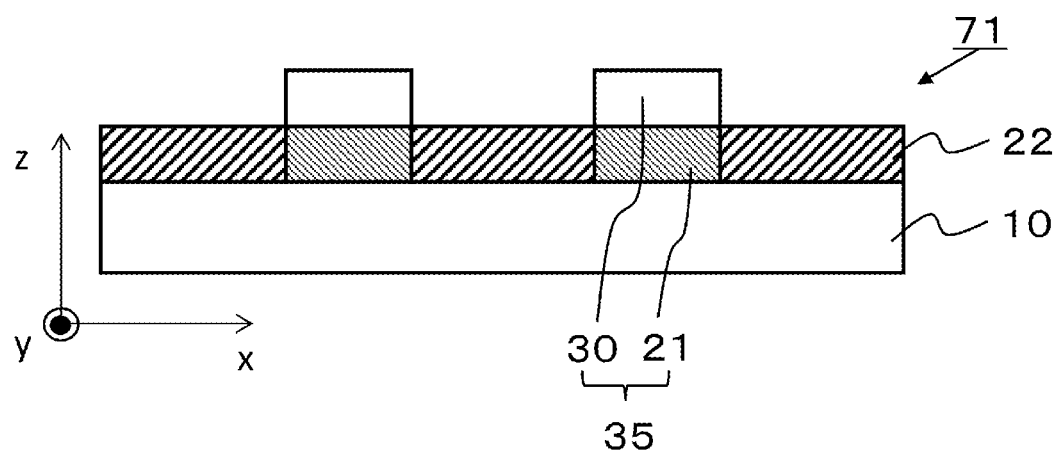
FIG. 2 is a schematic view for illustrating one production process of the decorative material according to the present invention.

The step (2) is a step of obtaining a laminate A (71) by forming the peelable ink decoration layer 35 on part of the base material 10 (see FIG. 2). The portion where the peelable ink decoration layer 35 is formed on the base material 10 corresponds to the first region of the decorative material produced by the production method according to the present invention. Examples of the configuration of the peelable ink decoration layer 35 include a monolayer of the first cured product layer 30 or a multi-layer configuration of the first cured product layer 30 laminated on the first decoration layer 21. In the step (2), the second decoration layer 22 is preferably formed on the portion other than where the peelable ink decoration layer 35 is formed on the base material 10.

Figure 3:
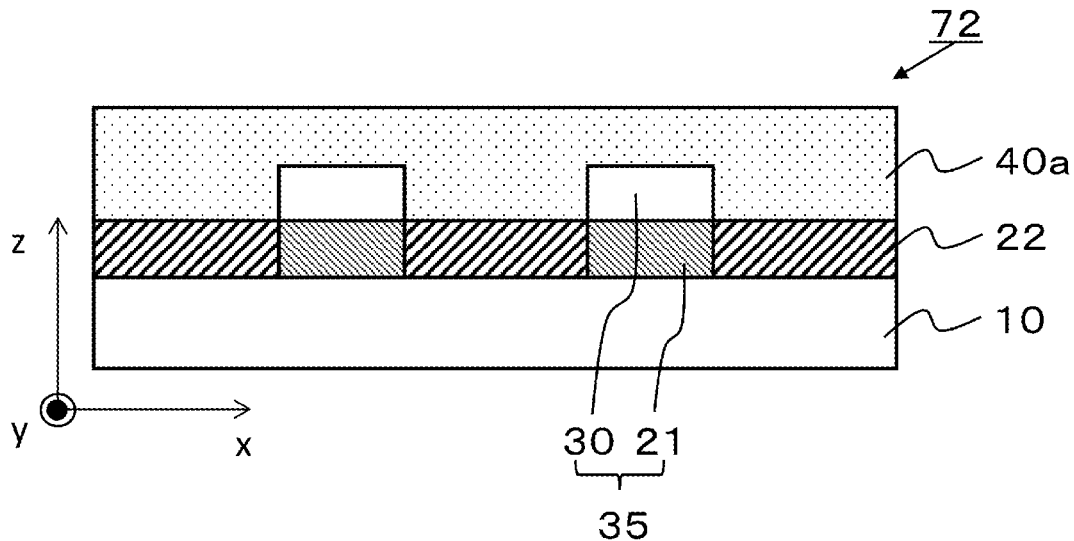
FIG. 3 is a schematic view for illustrating another production process of the decorative material according to the present invention.
Figure 4:
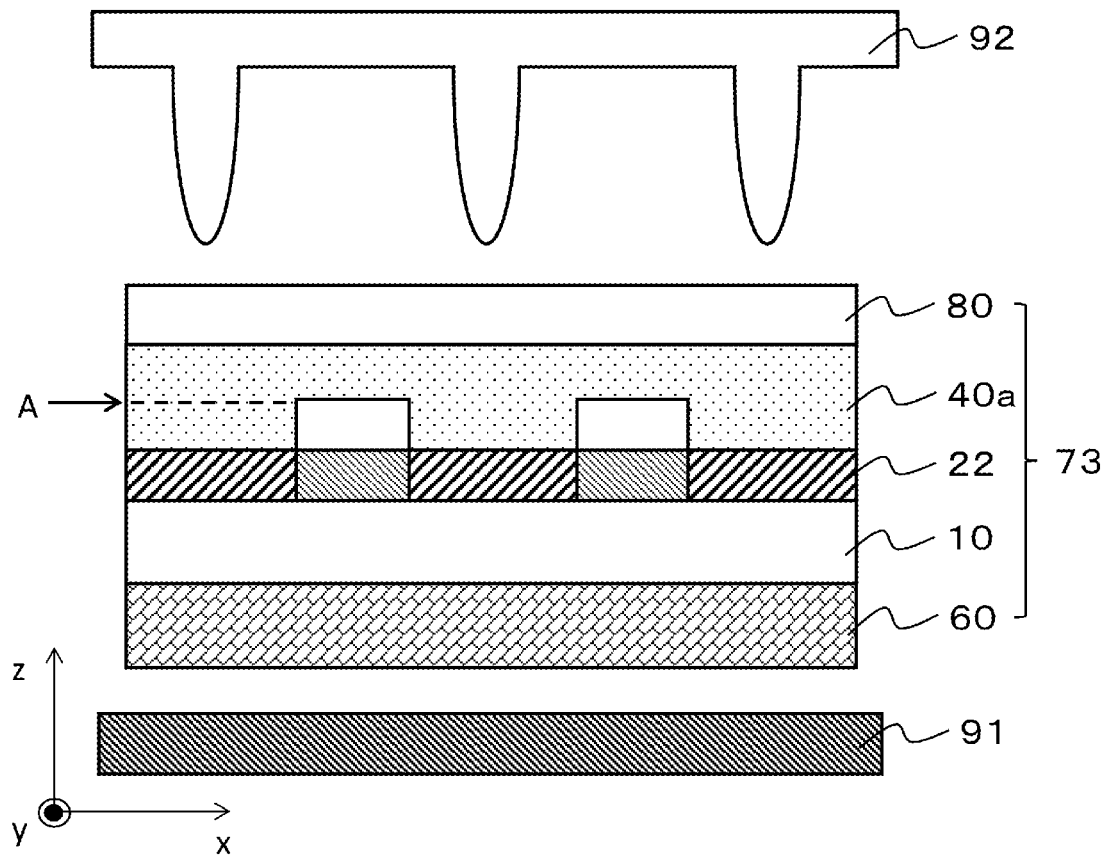
FIG. 4 is a schematic view for illustrating another production process of the decorative material according to the present invention.

The step (3) is a step of obtaining a laminate B (72) by impregnating the laminate A with a curable resin composition to form an uncured curable resin composition layer 40a on the entire surface of the laminate A including peelable ink decoration layer 35 (see FIG. 3). If a base material having liquid permeability such as a paper base material or a fiber base material is used as the base material 10, the curable resin is impregnated into the base material 10 in the step (3).

The step (4) is a step of obtaining a laminate C (73) by disposing a reinforcing layer 60 on the base material 10 side of the laminate B and disposing a releasing film 80 on the uncured curable resin composition layer 40a side of the laminate B.

In the step (7) described later, the releasing film 80 has a role to remove the cured product layer on the peelable ink decoration layer 35 in the cured product layer prepared by curing the uncured curable resin composition layer 40a. In other words, the releasing film 80 can be formed of any material as long as the first region satisfies A1>A2 and the second region satisfies A1<A2, where the adhesive force between the releasing film 80 and a cured product layer of the uncured curable resin composition layer 40a is defined as A1, and the adhesive force between the cured product layer of the uncured curable resin composition layer 40a and the layer located on the base material 10 side of the cured product layer (peelable ink decoration layer 35 in the case of the first region, and second decoration layer 22 or base material 10 in the case of the second region) is defined as A2.

Examples of the releasing film 80 include monolayer sheets of various resins such as polyester resins such as polyethylene terephthalate and polybutylene terephthalate; polyolefin resins such as polyethylene and polypropylene; and acrylic resins; and these resin sheets including a resin layer formed thereon.

Preferred examples of the resin which forms the resin layer disposed on the resin sheet include thermosetting resins and the ionizing radiation curable resins exemplified in the descriptions of the first cured product layer and the second cured product layers.

The resin layer may contain an inorganic filler. The inorganic filler contained in the resin layer can provide a uneven structure to the surface of the second region when the releasing film is peeled off, thus providing a design of a better feel. Examples of the inorganic filler include those exemplified as the inorganic filler used in the first cured product layer. The inorganic filler to be used may be selected therefrom.

To facilitate satisfaction of Ra1>Ra2, the particle diameter of the inorganic filler in the resin layer is preferably smaller than that of the inorganic filler in the first cured product layer. From the same viewpoint, the content of the inorganic filler in the resin layer is preferably smaller than that of the inorganic filler in the first cured product layer.

The step (5) is a step of heat pressing the laminate C (73) in the state where a mirror plate 91 is disposed on the reinforcing layer 60 side of the laminate C (73) and an embossing plate 92 is disposed on the releasing film 80 side of the laminate C (73) (see FIG. 4), thereby curing the uncured curable resin composition layer 40a to form a cured product layer, and forming a second recess 52 with the embossing plate 92, the second recess reaching a position in the thickness direction deeper than the vertex portion of the peelable ink decoration layer 35 in the laminate C (73). The vertex portion of the peelable ink decoration layer 35 corresponds to the position represented by referential sign A in FIGS. 4 and 5.

If a base material having liquid permeability such as a paper base material or a fiber base material is used as the base material 10, the curable resin impregnated into the base material 10 in the step (3) can also be cured in the step (5).

Examples of the mirror plate 91 include metal plates having an approximately smooth surface. As the embossing plate 92, a metal plate having projections complementary to the second recess 52 can be used. The embossing plate can be prepared by machining or etching.

The condition for heat pressing may be appropriately adjusted according to the type of thermosetting resin used without limitation. Usually, the temperature is 100 to 200° C., the pressure is 0.1 to 9.8 MPa, and the time is 10 seconds to 120 minutes.

The step (6) is a step of extracting the laminate C from between the mirror plate 91 and the embossing plate 92.

Figure 5:
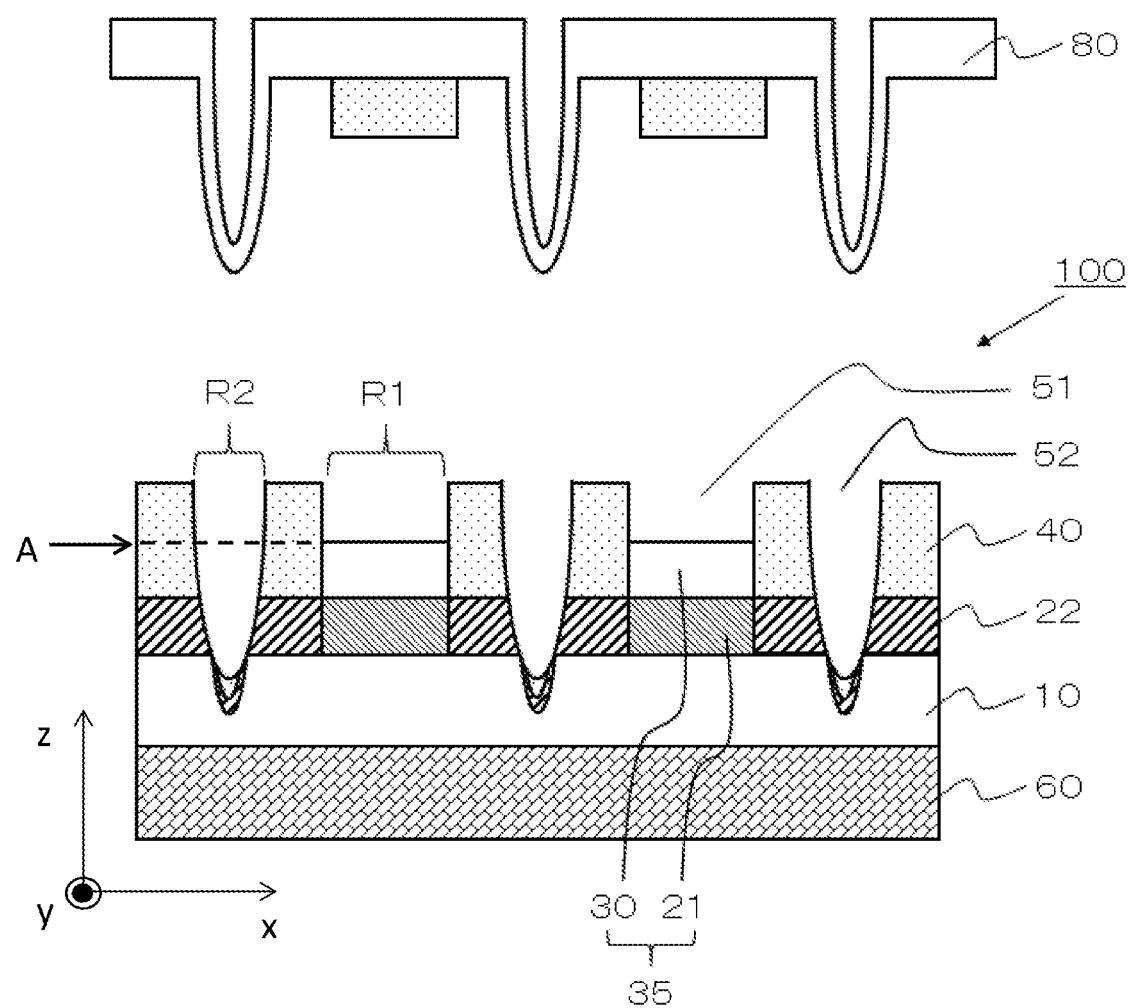
FIG. 5 is a schematic view for illustrating another production process of the decorative material according to the present invention.

The step (7) is a step of removing the releasing film 80 and the cured product layer on the peelable ink decoration layer 35 in the cured product layer when the releasing film 80 is peeled and removed from the laminate C, to form a first region R1 having a first recess 51 formed immediately above the peelable ink decoration layer 35 and a second region R2 having a residue of the cured product layer and a second recess 52 (see FIG. 5).

EXAMPLES

Next, the present invention will be described in in more detail by way of Examples, but these examples should not be construed as limitations to the present invention.
1. Evaluations
1-1. Stereoscopic Visual Effect Any 20 adults visually evaluated the decorative materials prepared in Examples and Comparative Examples under light of a fluorescent lamp whether they had the stereoscopic visual effect or not.
  A: 18 or more of them determine that it has designability with a high stereoscopic visual effect.
  B: 15 to 17 of them determine that it has designability with a high stereoscopic visual effect
  C: 14 or less of them determine that it has designability with a high stereoscopic visual effect.
1-2. Texture Any 20 adults evaluated the decorative materials prepared in Examples and Comparative Examples whether he/she felt the uneven structure to the touch by fingers.
  A: 18 or more of them determine that he/she feels the uneven structure.
  B: 15 to 17 of them determine that he/she feels the uneven structure.
  C: 14 or less of them determine that he/she feels the uneven structure.
1-3. Difference Between Look of Design and Texture In the evaluation 1-2 above, these adults evaluated whether the look of the design matched with the texture or not.
  AA: 18 or more of them determine that the look of the design matches with the texture.
  A: 15 to 17 of them determine that the look of the design matches with the texture.
  B: 13 to 14 of them determine that the look of the design matches with the texture.
  C: 12 or less of them determine that the look of the design matches with the texture.
1-4. Whitening Any 20 adults visually evaluated the decorative materials prepared in Examples and Comparative Examples under light of a fluorescent lamp whether whitening looked bothering or not.
  A: 18 or more of them determine that whitening looks less bothering.
  B: 15 to 17 of them determine that whitening looks less bothering.
  C: 14 or less of them determine that whitening looks less bothering.
2. Preparation of Decorative Material Example 1

A printing ink (DIC Graphics Corporation, "Ode SPTI") was applied onto a base material (titanium paper raw paper for a construction material, trade name "PM-67P" available from KJ SPECIALTY PAPER Co., Ltd., basis weight: 80 g/m$^2$, thickness: 100 µm) by gravure printing to form a decoration layer having a wood grain duct pattern and having a thickness of 3 µm on the entire surface of the base material. In the next step, the following curable resin composition for forming a first cured product layer was printed on part of the decoration layer, and was cured through irradiation with an electron beam (pressurized voltage: 165 KeV, 3 Mrad (30 kGy)). Thus, a laminate A including a first cured product layer (thickness: 2 µm) was prepared. The first cured product layer was formed to match with the duct pattern of the decoration layer.

Using an impregnation apparatus, the laminate A was impregnated with a curable resin composition for forming a second cured product layer such that the cured resin composition was 80 g/m$^2$ (in dryness), and was dried to prepare a laminate B.

In the next step, the releasing film below was laminated on the surface of the laminate B opposite to that including the base material (surface including the uncured second cured product layer), and a reinforcing layer (made of three layers of phenol resin-impregnated core paper (available from Ohta Sangyo K. K., Ohta Core, basis weight: 245 g/m$^2$) prepared by impregnating a sheet of Kraft paper with a liquid uncured resin composition made of a phenol resin) was laminated on the surface on the base material side of the laminate B to prepare a laminate C.

In the next step, the laminate C was sandwiched between the mirror plate and the embossing plate (the mirror plate was disposed on the reinforcing layer side, and the embossing plate was disposed on the releasing film side), followed by heating and pressurizing molding at a molding temperature of 150° C. and a molding pressure of 100 kg/cm$^2$ for 10 minutes with a heat press. After the molding, the laminate C was removed from the mirror plate and the embossing plate, and the releasing film was peeled from the laminate C to prepare a decorative plate in Example 1. When the releasing film was peeled and removed from the laminate C, the releasing film and the second cured product layer on the first cured product layer in the second cured product layer were removed. Thus, the first region having the first recess was formed immediately above the peelable ink decoration layer (first cured product layer and the decoration layer (first decoration layer) located thereunder). The second region having the second recess was formed in portions corresponding to the projections of the embossing plate.

Table 1 shows W1, W2, P1, P2, L1, L2, D1, D2, S1/S, and S2/S of the decorative material in Example 1.
<Curable Resin Composition for Forming First Cured Product Layer>

Components below were stirred with a process homogenizer (available from SMT Co., Ltd., "PH91") at the number of rotations of 2000 rpm for 1 hour to prepare a resin composition.

ionizing radiation curable resin (mixture of dipentaerythritol pentaacrylate and dipentaerythritol hexaacrylate, available from TOAGOSEI CO., LTD., trade name "ARONIX M400"): 60 parts by mass silicone mold release agent (dual-end methacryloyloxyalkyl-modified organopolysiloxane, available from Shin-Etsu Chemical Co., Ltd., trade name "X-22-164B"): 0.9 parts by mass silane coupling treatment silica: 18 parts by mass methyl ethyl ketone: 40 parts by mass <Curable Resin Composition for Forming Second Cured Product Layer> melamine formaldehyde resin: 60 parts by mass water: 35 parts by mass isopropyl alcohol: 5 parts by mass <Preparation of Releasing Film>

The following ionizing radiation curable resin composition was applied onto an easily adhesive surface of a polyethylene terephthalate film (available from TOYOBO CO., LTD., trade name "COSMOSHINE A4100") having a thickness of 50 μm, and was cured through irradiation with an electron beam (pressurized voltage: 165 KeV, 5 Mrad (50 kGy)) to form a cured product layer having a thickness of 5 μm. Thus, a releasing film was prepared.

<<Ionizing Radiation Curable Resin Composition>> ionizing radiation curable resin (ethylene bottom oxide modified product of trimethylolpropane triacrylate, available from TOAGOSEI CO., LTD., trade name "ARONIX M350"): 100 parts by mass silicone mold release agent (dual-end methacryloyloxyalkyl-modified organopolysiloxane, available from Shin-Etsu Chemical Co., Ltd., trade name "X-22-164B"): 2 parts by mass silica particles (available from Fuji Silysia Chemical Ltd., trade name "Sylysia 450", average particle size: 5.2 μm): 8 parts by mass ethyl acetate: 50 parts by mass Examples 2 to 4

Decorative materials in Examples 2 to 4 were prepared in the same manner as in Example 1 except that the values of W1, W2, P1, P2, L1, L2, D1, D2, S1/S, and S2/S were varied as shown in Table 1.

Comparative Example 1

A decorative material in Comparative Example 1 was prepared in the same manner as in Example 1 except that the laminate C was sandwiched between two mirror plates during heating and pressurizing molding. The decorative material in Comparative Example 1 had only the first recess as the recess, and did not have the second recess corresponding to the projections of the embossing plate.

TABLE 1

|  |  | Example | | | | Comparative Example |
|---|---|---|---|---|---|---|
|  |  | 1 | 2 | 3 | 4 | 1 |
| First recess | W1 (mm) | 272 | 258 | 263 | 252 | 267 |
|  | P1 (mm) | 190 | 176 | 185 | 181 | 195 |
|  | L1 (mm) | 880 | 945 | 890 | 920 | 950 |
|  | D1 (μm) | 1.8 | 1.5 | 1.7 | 1.5 | 1.9 |

TABLE 1-continued

|  |  | Example | | | | Comparative Example |
|---|---|---|---|---|---|---|
|  |  | 1 | 2 | 3 | 4 | 1 |
| Second recess | W2 (mm) | 66.6 | 46.6 | 450.0 | 50.3 | — |
|  | P2 (mm) | 46.4 | 37.1 | 46.5 | 103.5 | — |
|  | L2 (mm) | 500 | 450 | 480 | 530 | — |
|  | D2 (μm) | 57.0 | 55.0 | 57.0 | 56.0 | — |
| Relation between first recess and second recess | W2/W1 | 0.24 | 0.18 | 1.71 | 0.20 | — |
|  | P2/P1 | 0.24 | 0.21 | 0.25 | 0.57 | — |
|  | L2/L1 | 0.57 | 0.48 | 0.54 | 0.58 | — |
|  | Wr/Pr | 1.0 | 0.9 | 6.8 | 0.3 | — |
|  | Wr/Lr | 0.4 | 0.4 | 3.2 | 0.3 | — |
|  | Pr/Lr | 0.4 | 0.4 | 0.5 | 1.0 | — |
| Area | S1/S | 0.40 | 0.18 | 0.21 | 0.13 | 0.38 |
|  | S2/S | 0.23 | 0.08 | 0.30 | 0.07 | — |
|  | S2/S1 | 0.56 | 0.44 | 1.39 | 0.54 | — |
| Stereoscopic visual effect |  | A | A | A | A | A |
| Texture |  | A | A | A | A | C |
| Difference between look of design and texture |  | AA | AA | B | A | C |
| Whitening |  | A | A | B | B | A |

The results in Table 1 reveal that the decorative materials in Examples 1 to 4 had the stereoscopic visual effect and a better feel. In particular, the decorative materials in Examples 1 and 2 had an appropriate relation between the width and interval of the first recess and those of the second recess, and thus had a small difference between the look of the design and the texture.

Although not shown in the table, the angle formed by the arrangement direction of the first recess and the arrangement direction of the second recess was approximately parallel in the decorative materials in Examples.

REFERENCE SIGNS LIST

10: base material
21: first decoration layer
22: second decoration layer
30: first cured product layer
35: peelable ink decoration layer
40: second cured product layer
40a: uncured curable resin composition layer
51: first recess
52: second recess
60: reinforcing layer
71: laminate A
72: laminate B
73: laminate C
80: releasing film
91: mirror plate
92: embossing plate
100: decorative material

The invention claimed is:

1. A decorative material comprising at least a base material,
comprising a first region and a second region within a plane of the decorative material when seen in planar view,
wherein the first region includes an ink decoration layer disposed on the base material and a first recess formed immediately above the ink decoration layer, and
the second region includes a second recess deeper than the first recess,
wherein the ink decoration layer is a monolayer structure of a first cured product layer or a laminate structure including a first decoration layer and a first cured product layer disposed in sequence from the base material, and where the first cured product layer containing a mold release agent,
wherein the ink decoration layer is not included within the second region.

2. The decorative material according to claim 1, wherein at least one of the following formulae (1) to (3) is satisfied:

$$0.1 \leq W2/W1 \leq 1.0 \quad (1)$$

$$0.1 \leq P2/P1 \leq 1.0 \quad (2)$$

$$0.1 \leq L2/L1 \leq 1.0 \quad (3)$$

wherein an average width of the first recess is defined as W1, an interval of the first recess in a transverse direction is defined as P1, an average length of the first recess is defined as L1, an average width of the second recess is defined as W2, an interval of the second recess in the transverse direction is defined as P2, and an average length of the second recess is defined as L2.

3. The decorative material according to claim 1, wherein the following expression (4) is satisfied:

$$S2/S1 \leq 1.0 \quad (4)$$

wherein a total area of the first region is defined as S1 and a total area of the second region is defined as S2.

4. The decorative material according to claim 1, wherein an average depth D2 of the second recess is 10 μm or more.

5. The decorative material according to claim 1, wherein the first cured product layer contains an ionizing radiation curable resin.

6. The decorative material according to claim 1, wherein the second region includes a second decoration layer disposed on the base material and a second cured product layer disposed on the second decoration layer.

7. The decorative material according to claim 6, wherein the second cured product layer contains a melamine resin.

8. The decorative material according to claim 1, wherein the base material is a paper base material.

9. The decorative material according to claim 1, wherein the first region forms at least one pattern selected from the group consisting of duct, latewood, and knot patterns in a wood material.

10. A method for producing the decorative material according to claim 1, the method comprising steps (1) to (7):
  (1) a step of providing a base material;
  (2) a step of obtaining a laminate A by forming an ink decoration layer on part of the base material;
  (3) a step of obtaining a laminate B by impregnating the laminate A with a curable resin composition to form an uncured curable resin composition layer on an entire surface of the laminate A including the ink decoration layer;
  (4) a step of obtaining a laminate C by disposing a reinforcing layer on the base material side of the laminate B and disposing a releasing film on the uncured curable resin composition layer side of the laminate B;
  (5) a step of heat pressing the laminate C in a state where a mirror plate is disposed on the reinforcing layer side of the laminate C and an embossing plate is disposed on the releasing film side of the laminate C, thereby curing the uncured curable resin composition layer to form a cured product layer, and forming a second recess with the embossing plate, the second recess reaching a position in the thickness direction deeper than the vertex portion of the ink decoration layer in the laminate C;
  (6) a step of extracting the laminate C from between the mirror plate and the embossing plate; and
  (7) a step of removing the releasing film and the cured product layer on the ink decoration layer when the releasing film is peeled and removed from the laminate C, to form a first region having a first recess formed immediately above the ink decoration layer and a second region having a residue of the cured product layer and the second recess.

* * * * *